United States Patent Office 3,520,824
Patented July 21, 1970

3,520,824
METHOD OF PREPARING SILICA-ALUMINA HYDROSOLS
Charles J. Plank, Woodbury, and Edward J. Rosinski, Deptford, N.J., assignors to Mobil Oil Corporation, a corporation of New York
No Drawing. Continuation of application Ser. No. 454,708, May 10, 1965. This application Apr. 1, 1969, Ser. No. 812,455
Int. Cl. B01j *13/00*
U.S. Cl. 252—313                  6 Claims

ABSTRACT OF THE DISCLOSURE

A method of converting a silica-alumina hydrogel to a silica-alumina hydrosol comprising peptizing the hydrogel with aqueous ammonia with at least about 0.25 moles of ammonia per mole of silica-alumina hydrogel being present in the peptizing mixture.

This invention is a continuation of Ser. No. 454,708 filed May 10, 1965 and now abandoned.

This invention relates to novel methods of preparing silica-alumina hydrosols and, more particularly, to a novel peptizing technique for preparing stable, homogeneous silica-alumina hydrosols.

In copending application Ser. No. 434,990, filed Feb. 2, 1965 and now abandoned, and entitled "Silica-Alumina Hydrosols and Methods for Their Preparation," a novel method is disclosed for preparing stable, homogeneous silica-alumina hydrosols, such hydrosols being characterized by their significantly great stability. The preferred method for preparing such hydrosols is disclosed in said copending application as involving the hydrolysis of a silica-alumina hydrogel by means of hydrothermal treatment.

The present application is similarly directed to the formation of stable, homogeneous silica-alumina hydrosols but by means of an alternative and extremely advantageous technique which essentially involves the ammonia peptization of silica-alumina hydrogel under certain specified conditions.

It is accordingly a primary object of the present invention to provide a novel method of preparation of stable, homogeneous silica-alumina hydrosols.

It is a further important object of the present invention to provide a novel method of preparation of stable, homogeneous silica-alumina hydrosols involving the peptization of silica-alumina hydrogels with aqueous ammonia, the pH of the hydrogel-aqueous ammonia mixture being at least about 9.5 and, in a preferred embodiment, at least about 10.

It is still another important object of the present invention to provide a novel method of preparing stable, homogeneous silica-alumina hydrosols from a silica-alumina hydrogel comprising peptizing said silica-alumina hydrogel with aqueous ammonia, at least about 0.25 mole of ammonia per mole of silica-alumina hydrogel being present in the peptizing mixture.

It is still a further significant object of the present invention to provide a novel method for preparing stable, homogeneous silica-alumina hydrosols having high product concentrations.

These and other important objects and advantages of the present invention will become more apparent upon reference to the ensuing description and appended claims.

As previously indicated, the high quality silica-alumina hydrosols of the present application are prepared by peptizing a silica-alumina hydrogel with aqueous ammonia, said peptizing process being carried out sufficiently to effect the desired conversion of the hydrogel to the hydrosol. In accordance with the present invention, it is a critical feature of said peptizing technique that the pH of the hydrogel-aqueous ammonia mixture is at least about 9.5 and, preferably, at least about 10. At any reasonable product concentration of the reaction mixture (at least about 3), this minimum pH requirement will be satisfied if at least about 0.25 mole of ammonia per mole of silica-alumina hydrogel is present in the peptizing mixture. [As used in the specification and claims, "product concentration" is defined as grams of silica plus alumina per 100 cc. of hydrosol and will hereinafter be abbreviated as "p.c."]

The foregoing peptizing process may be carried out at temperatures ranging from 150° F. up to the critical temperature of water (about 700 F.), the preferred temperature being from about 180–300° F. The process is carried out at the autogenous pressure corresponding to the particular temperature used, the preferred pressure being atmospheric or higher. Treatment time will necessarily vary depending upon the temperature and pressure employed. At temperatures of at least 180° F. and atmospheric pressure, at least 10 hours of contact time is desirable. At temperatures between about 150–180° F. and atmospheric pressure, as much as several hundred hours of contact time may be desirable for most effective results.

Following the peptization step, the reaction mixture may be evaporated under vacuum to increase the solids content to the desired degree, a desirable product concentration of the silica-alumina hydrosol being at least about 3 and preferably at least about 5.

The silica-alumina hydrogels used as starting materials in this process may be commercially available hydrogels, an example of the preparation of such hydrogels being set forth in Pats. 2,384,946 and 2,385,217, whose disclosures are hereby incorporated by reference. Generally speaking, such silica-alumina hydrogels may be conveniently prepared through the mixing of a stream of waterglass with a stream containing sulfuric acid and aluminum sulfate. The waterglass stream, in terms of moles of oxides, should preferably contain about 0.05 to 0.2 gram of $SiO_2$/cc. with an $SiO_2/Na_2O$ mole ratio of up to about 3.5/1. The sulfuric acid-aluminum sulfate stream should preferably contain about 0.002 to about 0.15 gram of anhydrous aluminum sulfate per cc. and about 0.01 to about 0.08 gram of sulfuric acid per cc. The rate of flow of the waterglass will vary depending upon the desired pH, product composition and product concentration (p.c.).

In the following example of the process of the present invention the hydrogel employed was a silica-alumina hydrogel known as "Durabead 1" (DB–1). The Durabead 1 preparation is made by dispersing dried alumino-silicate catalyst fines into a silicate solution and then mixing with an acid alum solution at 8.5 pH. The hydrosol so formed is made into bead hydrogel by the conventional bead-forming method. The hydrogel is then heat treated at 110° F. for six hours followed by base exchange with aluminum sulfate and ammonium sulfate to reduce the sodium to low residual level. The bead hydrogel is then washed free of sulfate ion. This wet sodium and sulfate free hydrogel contained 11.5 wt. percent solids determined at 1000° F. (a p.c. of 11.5). These solids analyzed 90.9 wt. percent $SiO_2$, 8.93% $Al_2O_3$ and 0.17 wt. percent Na. A more complete description of the DB–1 hydrogel is set forth in Pat. No. 2,900,349, whose disclosure is hereby incorporated by reference.

A siilca-alumina hydrosol was prepared in accordance with the present invention by peptizing 4400 g. DB–1 hydrogel (77.5% matrix, 94% $SiO_2$–6% $Al_2O_3$+22.5 wt. percent dried fines; total composition 11.5% solids, 90.9% $SiO_2$, 8.93% $Al_2O_3$; this hydrogel was processed by aluminum sulfate base exchange) with 2000 cc. 10%

NH₄OH for 21 hours at 200° F. and atmospheric pressure. The peptizing mixture had a pH of about 11.2. The resulting hydrosol was separated from the settled dried fines (which, of course were not peptized) by decantation and then evaporated to a p.c. of 15.9 (determined at 1000° F.) under vacuum.

The silica-alumina hydrosols produced in accordance with the present invention are extremely stable, as was the case with the silica-alumina hydrosols prepared in said copending application, Ser. No. 434,990, which is now abandoned. As was the case in connection with such hydrosols, hydrosols produced by the process of the present invention have a multitude of potential uses, including all those for which silica sols are used, e.g., as paper fillers, in paints, in waxes (non-skid, etc.), as a fluid catalyst source, for textile treating, as a component in greases or in oil well drilling fluids, etc.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A method of preparing a silica-alumina hydrosol from a silica-alumina hydrogel comprising peptizing said silica-alumina hydrogel with aqueous ammonia, at least about 0.25 mole of ammonia per mole of silica-alumina hydrogel being present in the peptizing mixture; the product concentration of said peptizing mixture being at least about 3 grams of silica plus alumina per 100 cc. of hydrosol.

2. A method as defined in claim 1 wherein said peptizing method is carried out at least at atmospheric pressure.

3. A method as defined in claim 1 wherein said peptizing method is carried out at atmospheric pressure.

4. A method as defined in claim 1 wherein said peptizing method is carried out at a temperature of at least about 150° F. and at the autogeneous pressure corresponding to said temperature.

5. A method as defined in claim 1 wherein the pH of said peptizing mixture is at least about 9.5.

6. A method of preparing a silica-alumina hydrosol from a silica-alumina hydrogel comprising peptizing said silica-alumina hydrogel with aqueous ammonia, at least about 0.25 mole of ammonia per mole of silica-alumina hydrogel being present in the peptizing mixture.

References Cited

UNITED STATES PATENTS

| | | |
|---|---|---|
| 1,835,420 | 12/1931 | Neundlinger. |
| 2,384,946 | 9/1945 | Marisic. |

FOREIGN PATENTS

| | | |
|---|---|---|
| 546,377 | 9/1957 | Canada. |

RICHARD D. LOVERING, Primary Examiner

U.S. Cl. X.R.

106—286; 252—317